May 31, 1966 F. C. STEEHN 3,253,363
FISHING LURE
Filed April 17, 1964

INVENTOR.
Francis C. Steehn
BY
Hovey, Schmidt, Johnson & Hovey
ATTORNEYS.

United States Patent Office 3,253,363
Patented May 31, 1966

3,253,363
FISHING LURE
Francis C. Steehn, Kansas City, Mo., assignor of one-half to Lutz Meat Company, Kansas City, Mo., a partnership
Filed Apr. 17, 1964, Ser. No. 360,724
3 Claims. (Cl. 43—42.13)

This invention relates to an artificial fishing lure for use in trolling or casting and has as its primary object the provision of a fishing lure of improved construction which has a hook swingable from an operating position to a position clearing an obstruction in the water and then back to its operating position as the lure successively engages, passes over and moves beyond the obstruction while the lure is drawn through the water in the usual manner.

Conventional artificial fishing lures of the type having a hook-carrying portion extending rearwardly from and pivotally mounted on a forwardly disposed support are often ineffective to prevent the hook of the lure from becoming caught on an obstruction below the surface of the water, such as by a log or the like, inasmuch as the hook-carrying portion is usually free to swing in all directions as it is being drawn through the water by the support. It has been found that if the swinging of the hook is restricted to a single plane with respect to the support, the lure can be drawn through the water and the probability of catching the lure on an obstruction is minimized inasmuch as the hook cannot swing freely on the support. The present invention is directed to a lure which restricts the swinging movement of the hook thereof to a substantially vertical plane so that, as the lure engages and passes over an obstruction, the hook swings upwardly and away therefrom so as to clear the same until the obstruction has been passed. Thus, the trolling or casting operation continues without interruption.

It is, therefore, another important object of this invention to provide a fishing lure which restricts the swinging of the hook thereof to a substantially vertical plane in order to clear an obstruction and as the lure is drawn through the water, whereby the hook will not become entangled or caught on obstructions on either side of its path to thereby assure that its passage through the water will be substantially uninterrupted.

A further object of the invention is the provision of a lure which has a deflector on the forwardly disposed support thereof, which cooperates with the swinging action of the hook to push aside any obstructions in its path, and thus maintain the plane of swinging movement of the hook free of such obstructions. Thus, the hook will not be caught as it swings upwardly when the lure engages and passes over an obstruction therebeneath.

The present invention provides an artificial fishing lure having a relatively rigid, rod-like, forwardly extending support adapted to be secured at its forwardmost end to a fishing line whereby the line may draw the lure through the water. A fishing hook having a shank provided with a weight is pivotally secured to the opposite end of the support by pivot structure including a sleeve disposed transversely of the path of the lure, and a shaft received within and rotatable with respect to the sleeve. The sleeve is rigid to the weight and the shaft is formed on the proximal end of the support.

The weight, when the lure is being drawn through the water, has its major portion below the sleeve and shaft so that the hook attached to the weight will be in trailing relationship to the support. Upon striking an obstruction, the weight will rock about the obstruction to swing the hook in a substantially vertical plane to a position clearing the obstruction until the latter has been passed over by the lure.

Deflector means on the forward end of the support cooperates with the swinging action of the hook to push aside other obstructions in the path of the lure and to prevent the obstructions from entering the zone of swinging movement of the hook.

Figure 3:
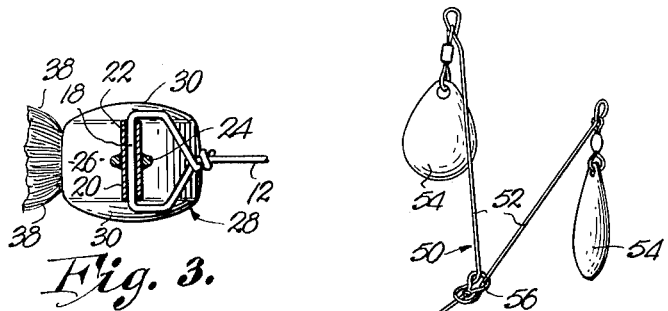
FIG. 3 is an enlarged, cross-sectional view taken along line 3—3 of FIG. 1 and further illustrating a portion of a rigid support forming a part of the lure.

Fishing lure 10 includes an elongated, relatively rigid, rod-like support 12 having an eye 14 at one end thereof to which an end of a flexible fishing line 16 is coupled. A pair of generally parallel arms at the opposite end of support 12 are integral with a shaft 18 transverse to the longitudinal axis of support 12. As illustrated in FIG. 3, shaft 18 and the aforesaid arms are formed by doubling a portion of support 12 to form a loop 20, shaft 18 forming a part of loop 20. Shaft 18, however, may be secured to support 12 in any manner.

Shaft 18 is received within and rotatable with respect to a sleeve 22 rigidly secured by an eye 24 to the circular outer periphery 26 of a weight 28. Eye 24 is symmetrically located with respect to the opposed sides 30 of weight 28 so that the line of action of weight 28 will normally pass through eye 24 when shaft 18 is received within sleeve 22 and as support 12 is drawn through the water under the influence of line 16.

A fishing hook 32 having a shank 34 and a barb 36 at one end thereof is rigidly secured at the opposite end to periphery 26 of weight 28. The end of shank 34 coupled to weight 28 is circumferentially spaced from eye 24 and at a location such that hook 32 is normally disposed in trailing relationship to support 12 in the manner shown in FIG. 1 when support 12 is drawn through the water by line 16.

To at least partially conceal hook 32 and to attract fish to lure 10 as it is being drawn through the water, a plurality of streamers 38 are secured at proximal ends thereof to the junction between shank 34 and weight 28 in any suitable manner. Streamers 38 are, like hook 32, disposed in trailing relationship to support 12 under normal conditions.

A rod-like deflector 40 is rigid to and extends laterally outwardly from support 12 adjacent eye 14. Deflector 40 has an eye 42 to which a reflector-type spinner or spoon 44 may be secured by a swivel 46. Deflector 40 extends upwardly and is disposed within the plane of swinging movement of hook 32 when support 12 and weight 28 are in the normal dispositions thereof shown in FIG. 1.

In use, line 16, being coupled to eye 14, draws lure 10 through the water and, inasmuch as the major portion of weight 28 is normally below shaft 18, hook 32 will be in trailing relationship to support 12 in its position shown in FIG. 1. Also, deflector 40 will be substantially upright and parallel to the plane of swinging movement of hook 32.

Figure 1:
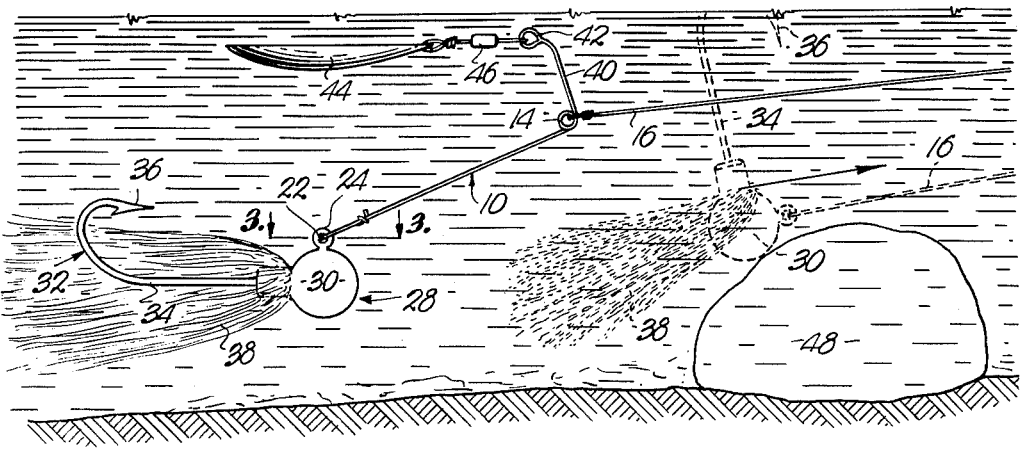
FIGURE 1 is a side elevational view of the lure made pursuant to the concepts of the present invention and illustrating its disposition as the same moves through the water in an undeflected condition and in a deflected condition.

When weight 28 contacts an obstruction 48 such as a rock or log, weight 28 will rock about its point of contact with obstruction 48 until sleeve 22 is in the dashed-line position of FIG. 1 with line 16 extending substantially radially from periphery 26. Hook 32 will then be in the dashed line position of FIG. 1 and will substantially clear obstruction 48. After weight 28 moves out of engagement with obstruction 48, it will assume its normal disposition below sleeve 22 with hook 32 in trailing relationship thereto.

Deflector 40 serves to push aside any obstructions in its path so that these obstructions will not move into the plane of swinging movement of hook 32.

By utilizing shaft 18 and sleeve 22, hook 32 is restricted to swinging movement in a vertical plane because sleeve 22 is rigid to weight 28 and is symmetrical with respect to sides 30 thereof. In this respect, sleeve 22 will remain substantially horizontal during normal movement of lure 10 through the water. As a result, barb 36 will be maintained in the plane of swinging movement of weight 28 so as to minimize or completely eliminate any tendency for barb 36 to be "hung up" or entangled on various obstructions adjacent to the path of lure 10.

Figure 2:
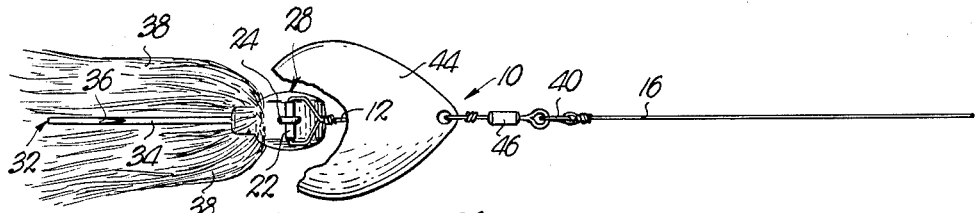
FIG. 2 is a top plan view of the lure illustrated in FIG. 1 with part of the spoon thereof broken away.
Figure 4:
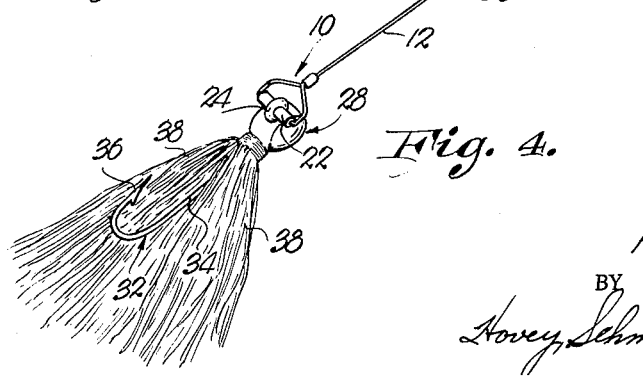
FIG. 4 is a perspective view of the lure having a deflector on the forward end thereof somewhat different from the deflector thereof illustrated in FIGS. 1 and 2.

The lure illustrated in FIG. 4 is identical in all respects to the lure of FIGS. 1 and 2 except that deflector 40 is replaced with a V-shaped deflector 50 having a pair of angularly disposed legs 52, each provided with a spinner or spoon 54 swivelly mounted to the outer end thereof. As illustrated, legs 52 are received within an eye 56 to connect deflector 50 to support 12, but it is to be emphasized that deflector 50 may be secured in any suitable manner to support 12. Legs 52 serve the same purpose as deflector 40 to maintain the plane of swinging movement of hook 32 free of obstructions as lure 10 is drawn through the water.

Having thus described the invention, what is claimed as new and desired to be secured by Letters Patent is:

1. A fishing lure adapted to be pulled through the water comprising:
   a weight having an outer periphery, and a pair of opposed sides;
   a pair of spaced, relatively rigid arms having laterally extending shaft structure thereon;
   means rotatably mounting said shaft structure adjacent to said outer periphery with said arms being disposed adjacent to respective sides of the weight, said arms having means thereon spaced from said shaft structure thereof for connecting the arms to a fishing line, whereby the weight is pulled through the water with said shaft structure disposed substantially transversely of the path of movement of the weight; said mounting means including a sleeve on said outer periphery and having a pair of ends adjacent to said sides of the weight, said shaft structure including a shaft extending through said sleeve and being secured at respective ends thereof to said arms;
   a hook having a shank secured at one end thereof to said weight in spaced relationship to said mounting means, said weight being normally disposed with said mounting means in a position adjacent to the uppermost extremity of the weight when the latter is pulled through the water, whereby the major portion of the weight will be below said shaft structure, said hook normally extending rearwardly from the weight when said mounting means is in said position, whereby the weight will rotate relative to said shaft structure to swing the hook upwardly to clear an obstruction when the forwardmost portion of the weight engages and rocks relative to said obstruction, said mounting means being disposed to substantially restrict the movement of said weight relative to said shaft structure for rotation about an axis through said shaft structure when said weight engages and rocks relative to an obstruction; and
   an eyelet rigid to said outer periphery midway between said sides of the weight, said sleeve extending through and being secured to said eyelet, said arms being connected together at a location spaced from and aligned with the eyelet.

2. A fishing lure adapted to be pulled through the water comprising:
   an elongated, relatively rigid support adapted to be secured at one end thereof to a fishing line for movement by the latter through the water;
   a hook having a shank;
   a weight rigid to said shank;
   means pivotally mounting said weight on said support adjacent to the opposite end thereof, said weight being normally in a disposition with its major portion below said mounting means when said support is drawn through the water by said line, said hook being normally in trailing relationship to said weight when the latter is in said disposition, said mounting means including structure restricting the pivoting of said weight and thereby the swinging of said hook to a plane substantially parallel to the path of said support through the water, whereby said hook is swung upwardly and away from an obstruction when the weight strikes the obstruction and rocks relative thereto as said support passes over the obstruction under the influence of said line; and
   a deflector extending laterally from said support and normally disposed above the path thereof in the plane of the swinging movement of said hook when said weight is in said disposition and a spoon swiveled to the outer end of said deflector.

3. A fishing lure adapted to be pulled through the water comprising:
   an elongated, relatively rigid support adapted to be secured at one end thereof to a fishing line for movement by the latter through the water;
   a hook having a shank;
   a weight rigid to said shank;
   means pivotally mounting said weight on said support adjacent to the opposite end thereof, said weight being normally in a disposition with its major portion below said mounting means when said support is drawn through the water by said line, said hook being normally in trailing relationship to said weight when the latter is in said disposition, said mounting means including structure restricting the pivoting of said weight and thereby the swinging of said hook to a plane substantially parallel to the path of said support through the water, whereby said hook is swung upwardly and away from an obstruction when the weight strikes the obstruction and rocks relative thereto as said support passes over the obstruction under the influence of said line; and
   a V-shaped deflector extending laterally from said support and normally disposed above the path thereof on opposed sides of the plane of swinging movement of said hook when said weight is in said disposition.

References Cited by the Examiner

UNITED STATES PATENTS

| | | | |
|---|---|---|---|
| 1,832,768 | 11/1931 | Davenport | 43—42.13 |
| 2,623,320 | 12/1952 | Bowman | 43—44.97 X |
| 2,994,151 | 8/1961 | Webb | 43—42.37 X |
| 3,143,824 | 8/1964 | Thomas | 43—42.11 |

OTHER REFERENCES

May 1955 issue of Field and Stream magazine, page 96.

SAMUEL KOREN, *Primary Examiner.*

R. L. HOLLISTER, *Assistant Examiner.*